A. LAMBERT.
DUPLEX GEARING FOR HOISTING DRUMS.
APPLICATION FILED MAY 11, 1908.

913,901.

Patented Mar. 2, 1909.
3 SHEETS—SHEET 1.

Witnesses:
L. Lee
J. W. Greenbaum

Inventor.
Asher Lambert, jr.
Thomas S. Crane, Atty.

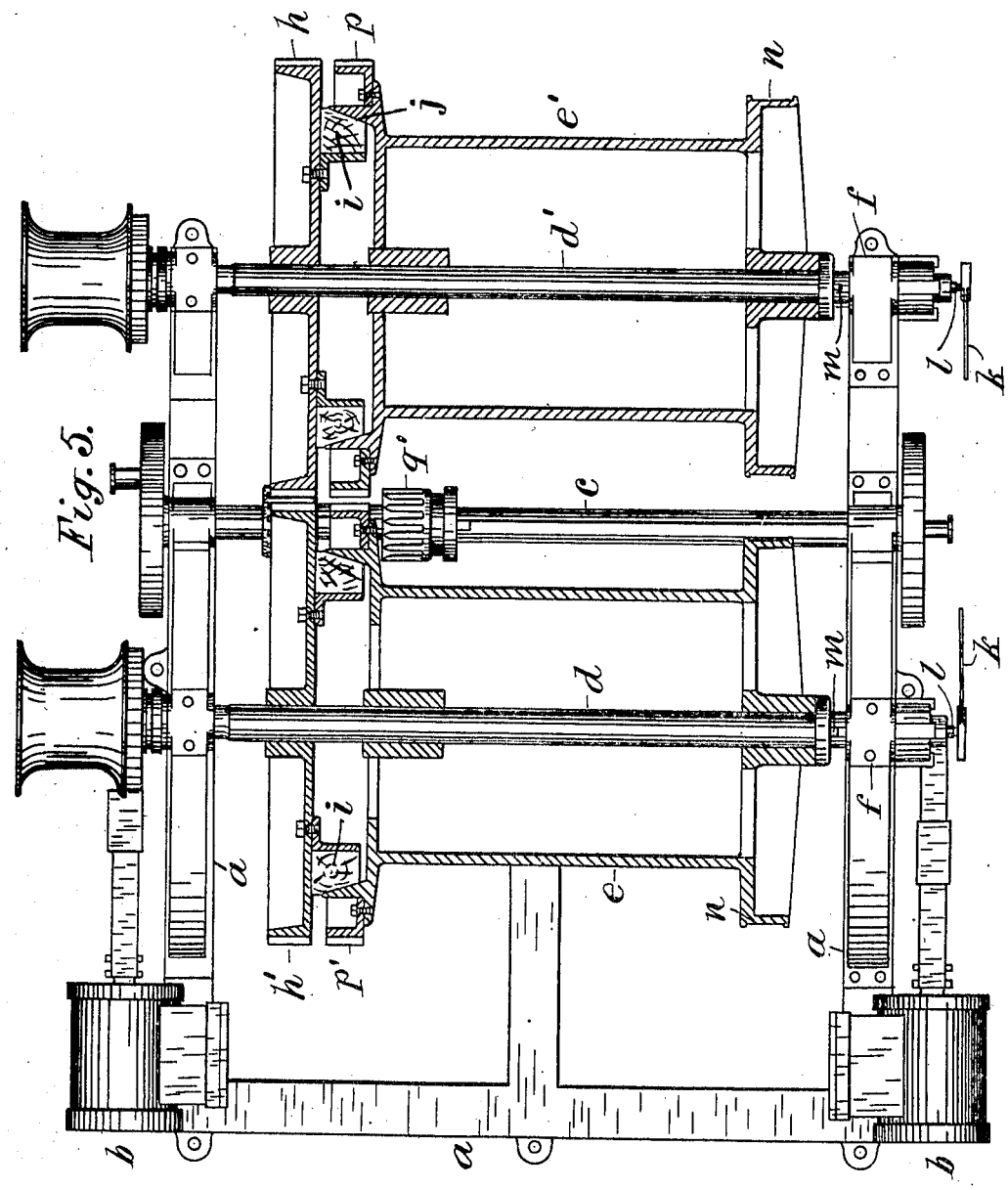

UNITED STATES PATENT OFFICE.

ASHER LAMBERT, OF NEWARK, NEW JERSEY.

DUPLEX GEARING FOR HOISTING-DRUMS.

No. 913,901.  Specification of Letters Patent.  Patented March 2, 1909.

Application filed May 11, 1908. Serial No. 432,093.

*To all whom it may concern:*

Be it known that I, ASHER LAMBERT, a citizen of the United States, residing at 1 Johnson avenue, Newark, county of Essex, and State of New Jersey, have invented certain new and useful Improvements in Duplex Gearing for Hoisting-Drums, fully described and represented in the following specification and the accompanying drawings, forming a part of the same.

The present invention relates to that class of hoisting machines in which a drum is rotated by connection to a motor-shaft, commonly by means of friction-wheels; and the turning of the drum to lower the load, when required, is effected by disconnecting the friction-wheels from the drum and controlling the rotation of the drum by a brake. Such an operation of the drum is sufficient in a machine where a single hoisting drum is used; but in certain cases the hoister is provided with two drums, and where it is required to turn both of the drums with exactly the same speed, either in hoisting or lowering, it is found difficult to accomplish this by friction-drivers, and still more difficult to lower both drums at the same rate by means of mere friction-brakes.

The present invention furnishes duplex gearing for connecting each drum with the motor-shaft, one train of such gearing including friction-wheels which form a readily detachable connection between the motor-shaft and the drum, and the other train consisting of toothed gear-wheels which, when each drum is connected thereby to the motor-shaft, forms a positive connection between the two drums and compels them to rotate in perfect unison. A brake can be used in the usual manner for lowering when the drums are thus positively connected by toothed gear-wheels, the speed of the drums being perfectly equalized by their toothed gear-wheel connection.

The invention will be understood by reference to the annexed drawing, in which—

Figure 2:
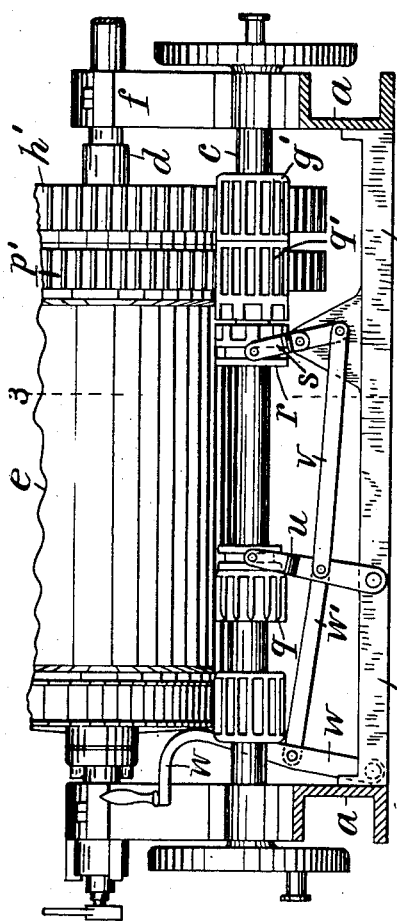
Figure 3:
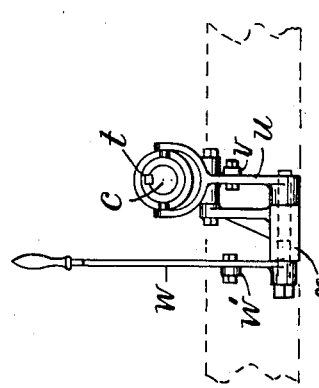
Figure 1:
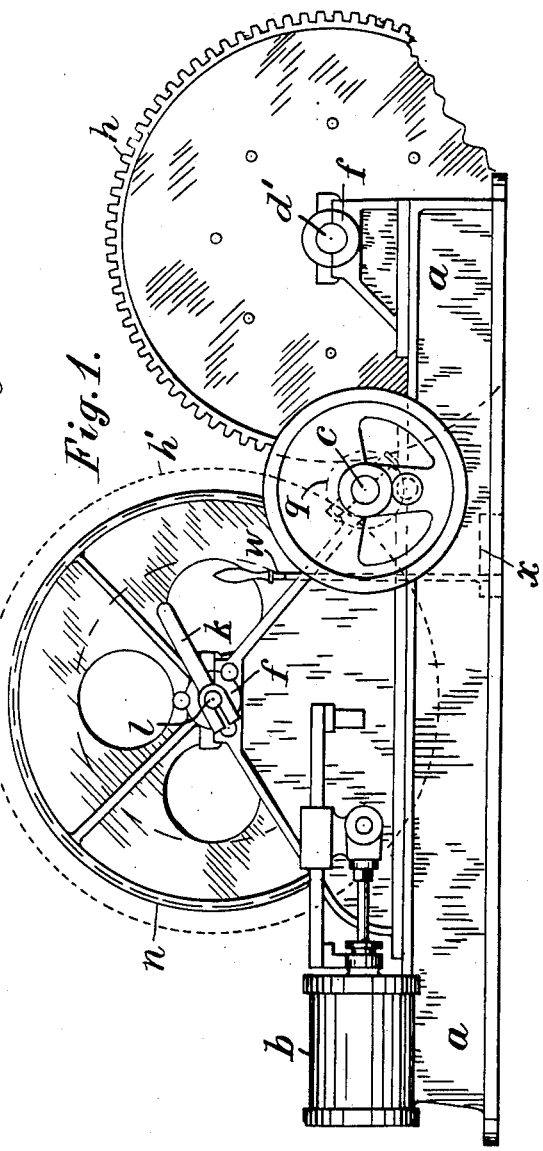
Figure 4:
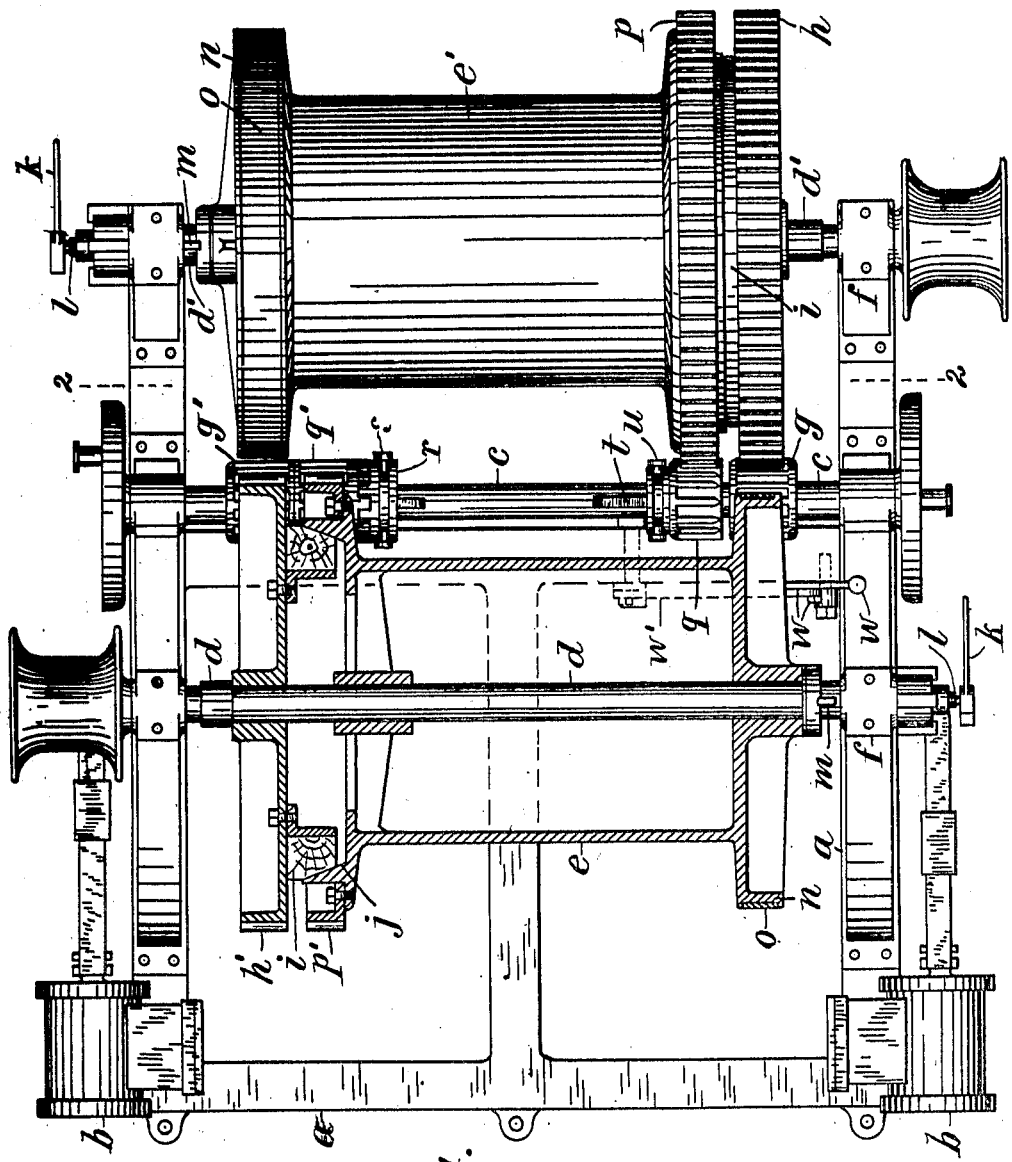

Figure 1 is a side elevation of a hoister embodying the invention; Fig. 2 is a cross section of the frame on line 2—2 in Fig. 3, with the outer drum-shaft removed and the drum and gearing carried thereby; Fig. 3 is a section of the motor-shaft and the clutch-connections on line 3—3 in Fig. 2; and Fig. 4 is a plan of the hoister with one of the drums and gearing in section at the center line of the drum-shaft. Fig. 5 shows an alternative construction.

The hoister-drum $a$ is shown provided with steam engine cylinders $b$ which are in practice connected with a crank-shaft $c$ which forms the motor-shaft for the hoister. An electric, or other motor may be used in place of a steam engine.

$d$ and $d'$ are drum-shafts carrying drums $e$ and $e'$, and journaled in bearings $f$ upon the frame at opposite sides of the motor-shaft $c$, and pinions $g$, $g'$, are attached to the motor-shaft to drive cog-wheels $h$, $h'$, provided each with a conical friction-driver $i$ which is fitted to a hollow cone $j$ upon one end of the adjacent drums. Each drum is provided with the usual means in a hand-lever $k$, screw $l$, and crosskey $m$ for pressing it toward the friction-driver $i$, when it is desired to rotate the drum by frictional connection with the motor-shaft. Each drum is provided at one end with a brake-wheel $n$ having strap $o$ which, when actuated in the usual manner, serves to control the backward rotation of the drum in lowering its load.

The construction so far described is common, and the improvement consists in furnishing each drum, in addition to its friction gearing, with a toothed cog-wheel $p$ or $p'$ which meshes with a pinion $q$ or $q'$ upon the motor-shaft. When either drum is engaged with the motor-shaft by the pinion $q$ or $q'$, and the friction driver detached, the drum is rotated positively by the motor-shaft and can by reversing the engine or motor be made to raise or lower the load at a positive rate. When both drums are engaged with the motor-shaft by the gears $p$, $p'$ and pinions $q$, $q'$ and the friction-drivers detached, the drums are compelled to move positively in unison, and ropes can be wound up or unwound from the two drums at precisely the same rate of speed. When such a positive connection is not desired, the pinions $q$ or $q'$ upon the motor-shaft may be detached from the gear-wheels $p$ or $p'$, by shifting endwise, or may be disconnected from the motor-shaft by disengaging a suitable clutch. Both constructions are shown in the drawing, and means provided for engaging or disengaging both pinions at once with the gear-wheels $p$, $p'$, so that a single hand-lever may suffice to connect or disconnect both drums with the motor-shaft. The pinion $q'$ for driving the drum $e$ is fitted to turn loosely upon the shaft $c$ and held from end movement by means not shown, and is connected with the shaft, when required, by a jaw-clutch $r$ which is movable longitudinally upon the shaft by a forked clutch-lever $s$. The pinion $q$ for driving the drum $e'$ is fitted to a spline $t$ upon the motor-shaft and can be moved endwise to withdraw its teeth from the toothed wheel $p$ by a forked clutch-lever $u$. The levers $s$ and $u$ are connected by a link $v$ and are actuated simultaneously by a hand-lever $w$ and connecting-rod $w'$. Both clutch-levers are fulcrumed upon a cross-tie $x$ between the side frames $a$, one end of such cross-tie being shown in Fig. 3, and the frame $a$ indicated merely in dotted lines to avoid obscuring the clutch connections. The pinion $q$ turns with the motor-shaft when disengaged from its toothed wheel $p$, as shown in Fig. 2; but the pinion $q'$ continues to mesh with its gear-wheel $p'$ when the jaw-clutch $r$ is retracted, as shown in Fig. 2, and this pinion is therefore turned upon the motor-shaft by the rotations of the drum $e$ when propelled by its friction-driver.

In Fig. 4, the pinions are both shown coupled to the motor-shaft and to the toothed wheels upon the drums, so as to connect both drums positively and make them rotate in unison. Any clutching mechanism may be employed which serves to connect the toothed wheels upon the drums positively with the motor-shaft so as to connect them together when rotation in unison is required.

Fig. 5 shows a slight modification of the construction in which both the friction-drivers $i$ are placed at the same side of the frame (that is, at the same ends of the two drums), and the gear $p$ is set in line with the gear $p'$ so that a single pinion $q'$ suffices to connect the drums positively. The means for shifting such pinion would be the same as is shown in Fig. 2, omitting the clutch-lever $u$ and connecting the rod $w'$ directly with the link $v$. Where two pinions $q$, $q'$ are used, as shown in Figs. 2 and 4, it is obvious that they may be moved separately if desired instead of by a single hand-lever $w$.

Having thus set forth the nature of the invention what is claimed herein is:

1. In a hoister, the combination, with a hoister-frame, of a motor mounted thereon, a motor shaft driven thereby, two drums mounted upon the frame, friction-gearing connecting the motor-shaft detachably with each of the said drums, and toothed gear-wheels for connecting the motor-shaft detachably with the two drums and adapted, when engaged with the drums, to rotate them positively in unison.

2. In a hoister, the combination, with a hoister-frame, of a motor with motor-shaft driven thereby, drum-shafts mounted in bearings upon the hoister-frame at opposite sides of the motor-shaft, drums fitted to turn thereon and having each a toothed gear-wheel rigidly attached, pinions upon the motor-shaft meshing with the said toothed gear-wheels, and means with a single hand-lever for operating the same to engage the shaft and both pinions at once with the toothed gear-wheels to rotate the drums in unison.

3. In a hoister, the combination, with a hoister-frame, of a motor with motor-shaft driven thereby, drum-shafts mounted in bearings upon the hoister-frame at opposite sides of the motor-shaft, drums fitted to turn thereon and having each a toothed gear-wheel rigidly attached, pinions upon the motor-shaft meshing with the said toothed gear-wheels, clutch-levers movable in opposite directions for disengaging the shaft and pinions from the toothed gear-wheels upon the drums, and a single hand-lever with suitable connections for simultaneously moving the clutch-levers in opposite directions.

In testimony whereof I have hereunto set my hand in the presence of two subscribing witnesses.

ASHER LAMBERT.

Witnesses:
T. M. WATSON, Jr.,
THOMAS S. CRANE.